(12) United States Patent
Fleming (10) Patent No.: US 9,095,823 B2
(45) Date of Patent: Aug. 4, 2015

(54) TUNABLE LAYERED MEMBRANE CONFIGURATION FOR FILTRATION AND SELECTIVE ISOLATION AND RECOVERY DEVICES

(71) Applicant: LOCKHEED MARTIN CORPORATION, Bethesda, MD (US)

(72) Inventor: Shawn P. Fleming, Mount Laurel, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 77 days.

(21) Appl. No.: 13/802,896

(22) Filed: Mar. 14, 2013

(65) Prior Publication Data
US 2013/0256211 A1 Oct. 3, 2013

Related U.S. Application Data

(60) Provisional application No. 61/617,264, filed on Mar. 29, 2012.

(51) Int. Cl.
| | |
|---|---|
| *B01D 71/02* | (2006.01) |
| *B01D 61/02* | (2006.01) |
| *B01D 61/12* | (2006.01) |
| *B01D 63/08* | (2006.01) |

(Continued)

(52) U.S. Cl.
CPC ............ *B01D 71/021* (2013.01); *B01D 61/022* (2013.01); *B01D 61/027* (2013.01); *B01D 61/12* (2013.01); *B01D 63/082* (2013.01); *B01D 65/08* (2013.01); *B01D 69/06* (2013.01); *C02F 1/44* (2013.01); *B01D 61/025* (2013.01); *B01D 2319/022* (2013.01); *B01D 2319/06* (2013.01); *B01D 2321/22* (2013.01); *B01D 2325/02* (2013.01); *C02F 1/441* (2013.01); *C02F 1/442* (2013.01); *C02F 1/444* (2013.01)

(58) Field of Classification Search
USPC .......................... 210/641, 649–650, 652, 653
See application file for complete search history.

(56) References Cited

U.S. PATENT DOCUMENTS

| | | | |
|---|---|---|---|
| 4,277,344 A | 7/1981 | Cadotte | |
| 4,855,058 A | 8/1989 | Holland et al. | |

(Continued)

FOREIGN PATENT DOCUMENTS

| | | | | |
|---|---|---|---|---|
| DE | 195 36 560 | 3/1997 | | |
| EP | 1 777 250 A1 | 5/2007 | ................. | C08J 7/04 |

(Continued)

OTHER PUBLICATIONS

Georgakilas, V., et al., "Functionalization of Graphene: Covalent and Non-Covalent Approaches, Derivatives and Applications," Chem. Rev., 2012, 112 (11), pp. 6156-6214 (published Sep. 25, 2012).*

(Continued)

*Primary Examiner* — Chester Barry
(74) *Attorney, Agent, or Firm* — Lathrop & Gage LLP (57) ABSTRACT

A tunable membrane configuration for a filtration or selective fluidic isolation and recovery device includes a housing having an inlet at one end and an outlet at an opposite end with an opening extending from the inlet to the outlet. An internal support structure is maintained in the opening, and layered filtration media is carried by the internal support structure, the media separating feed received at the inlet into at least three separate output flows.

26 Claims, 3 Drawing Sheets

(51) Int. Cl.
*B01D 65/08* (2006.01)
*B01D 69/06* (2006.01)
*C02F 1/44* (2006.01)

(56) References Cited

U.S. PATENT DOCUMENTS

| | | | |
|---|---|---|---|
| 4,880,440 A | | 11/1989 | Perrin |
| 4,889,626 A | * | 12/1989 | Browne ................. 210/359 |
| 5,425,858 A | | 6/1995 | Farmer |
| 5,636,437 A | | 6/1997 | Kaschmitter et al. |
| 5,679,249 A | | 10/1997 | Fendya et al. |
| 5,731,360 A | | 3/1998 | Pekala et al. |
| 5,902,762 A | | 5/1999 | Mercuri et al. |
| 5,925,247 A | * | 7/1999 | Huebbel ............... 210/321.75 |
| 5,932,185 A | | 8/1999 | Pekala et al. |
| 5,954,937 A | | 9/1999 | Farmer |
| 5,980,718 A | | 11/1999 | Van Konynenburg et al. |
| 6,309,532 B1 | | 10/2001 | Tran et al. |
| 6,346,187 B1 | | 2/2002 | Tran et al. |
| 6,462,935 B1 | | 10/2002 | Shiue et al. |
| 6,580,598 B2 | | 6/2003 | Shiue et al. |
| 6,659,298 B2 | | 12/2003 | Wong |
| 6,661,643 B2 | | 12/2003 | Shiue et al. |
| 7,014,829 B2 | | 3/2006 | Yanagisawa et al. ....... 423/447.1 |
| 7,138,042 B2 | | 11/2006 | Tran et al. |
| 7,175,783 B2 | | 2/2007 | Curran |
| 7,267,753 B2 | | 9/2007 | Anex et al. |
| 7,459,121 B2 | | 12/2008 | Liang et al. |
| 7,505,250 B2 | | 3/2009 | Cho et al. |
| 7,600,567 B2 | | 10/2009 | Christopher et al. |
| 7,706,128 B2 | | 4/2010 | Bourcier |
| 7,761,809 B2 | | 7/2010 | Bukovec et al. |
| 8,147,599 B2 | | 4/2012 | McAlister ................. 96/154 |
| 8,361,321 B2 | * | 1/2013 | Stetson et al. ............. 210/652 |
| 2005/0189673 A1 | | 9/2005 | Klug et al. |
| 2009/0294300 A1 | | 12/2009 | Kanzius |
| 2010/0025330 A1 | | 2/2010 | Ratto et al. |
| 2010/0127312 A1 | * | 5/2010 | Grebel et al. ............. 257/288 |
| 2010/0167551 A1 | | 7/2010 | DeDontney |
| 2011/0041519 A1 | * | 2/2011 | McAlister ................. 62/46.1 |
| 2012/0048804 A1 | * | 3/2012 | Stetson et al. ............. 210/653 |
| 2012/0183738 A1 | | 7/2012 | Zettl et al. |
| 2012/0255899 A1 | | 10/2012 | Choi et al. ................ 210/489 |
| 2013/0015136 A1 | | 1/2013 | Bennett et al. |
| 2013/0100436 A1 | * | 4/2013 | Jackson et al. ............ 356/51 |
| 2013/0105417 A1 | | 5/2013 | Stetson et al. |
| 2013/0240355 A1 | * | 9/2013 | Ho et al. ................. 204/451 |
| 2013/0240437 A1 | * | 9/2013 | Rodrigues et al. ........ 210/500.28 |
| 2013/0248367 A1 | * | 9/2013 | Stetson et al. ............. 204/518 |
| 2013/0249147 A1 | | 9/2013 | Bedworth |
| 2013/0256210 A1 | | 10/2013 | Fleming |
| 2013/0256211 A1 | | 10/2013 | Fleming |
| 2013/0270188 A1 | * | 10/2013 | Karnik et al. ............. 210/650 |
| 2013/0277305 A1 | | 10/2013 | Stetson et al. |
| 2014/0231351 A1 | * | 8/2014 | Wickramsinghe et al. ... 210/652 |
| 2014/0261999 A1 | | 9/2014 | Stetson et al. |
| 2014/0263035 A1 | | 9/2014 | Stoltenberg et al. |
| 2014/0263178 A1 | | 9/2014 | Sinton et al. |
| 2014/0272286 A1 | | 9/2014 | Stoltenberg et al. |
| 2014/0377738 A1 | | 12/2014 | Bachmann et al. |

FOREIGN PATENT DOCUMENTS

| | | | | |
|---|---|---|---|---|
| EP | 2 230 511 A1 | 9/2010 | ........... | G01N 33/487 |
| KR | 10-20120022164 A | 3/2012 | ........... | B01D 39/20 |
| WO | WO 95/00231 | 1/1995 | ........... | B01D 29/64 |
| WO | WO 2007/140252 A1 | 12/2007 | ........... | B01D 71/00 |
| WO | WO 2009/129984 A1 | 10/2009 | ........... | B01D 69/08 |
| WO | WO 2011/019686 A1 | 2/2011 | ........... | B01D 61/14 |
| WO | WO 2011/063458 A1 | 6/2011 | ........... | B01D 67/00 |
| WO | WO 2012/006657 A1 | 1/2012 | ........... | C01B 31/04 |
| WO | WO 2012/030368 A1 | 3/2012 | ........... | B01J 16/12 |
| WO | WO 2013/138137 | 9/2013 | | |
| WO | WO 2013/151799 | 10/2013 | | |

OTHER PUBLICATIONS

Barreiro, A., et al., "Transport Properties of Graphene in High-Current Limit," Phys. Rev. Letters., 103, 076601 (2009).*
Zhou, K., et al., "One-pot preparation of graphene/ Fe3O4 composites by a solvothermal reaction," New J. Chem., 2010, 34, 2950.*
He, F., et al., "The attachment of Fe3O4 nanoparticles to graphene oxide by covalent bonding," Carbon, 2010, 48, 3139.*
*Aquatic Biofouling Prevention by Electrically Charged Nanocomposite Polymer Thin Film Membranes*; de Lannoy et al; 2013 American Water Work Association membrane Technology Conference;.
Mishra et al.; *Functionalized Graphene Sheets for Arsenic Removal and Desalination of Sea Water*; Desalination, Elsevier, Amsterdam, NL; vol. 282; Jan. 13, 2011.
Corresponding U.S. Appl. No. 13/803,958, filed Mar. 14, 2013.
International Search Report in corresponding application No. PCT/US2013/033400 mailed Jun. 28, 2013.
Written Opinion in corresponding application No. PCT/US2013/033400 mailed Jun. 28, 2013.
International Search Report in corresponding application No. PCT/US2013/033403 mailed Jun. 28, 2013.
Written Opinion in corresponding application No. PCT/US2013/033403 mailed Jun. 28, 2013.
Karan et al.; *Ultrafast Viscous Permeation of Organic Solvents Through Diamond-Like Carbon Nanosheets*; Science; vol. 335; Jan. 27, 2012; pp. 444-447.
Nair et al; *Unimpeded Permeation of Water Through Helium-Leak-tight Graphene-Based Membranes*; Science; vol. 335; Jan. 27, 2012; pp. 442-443.
Jiang et al.; *Porous Graphene as the Ultimate Membrane for Gas Separation*; Nano Letters; Sep. 23, 2009; vol. 9, No. 12; pp. 4019-4024.
Suk et al.; *Water Transport Through Ultrathin Graphene*; Journal of Physical Chemistry Letters; Apr. 30, 2010; pp. 1590-1594.
Sint et al.; *Selective Ion Passage through Functionalized Graphene Nanopores*; JACS Communications; 2008 American Chemical Society; Jun. 10, 2008; pp. 16448-16449.
Paul, Donald R.; *Creating New Types of Carbon-Based Membranes*; Science; vol. 335; Jan. 27, 2012; pp. 413-414.
Cohen-Tanugi et al.; *Water Desalination across Nanoporous Graphene*; Nano Letters; American Chemical Society; Jun. 1, 2012; pp. A-G.
Bae et al. (Jun. 20, 2010) "Roll-to-roll production of 30-inch graphene films for transparent electrodes," *Nature Nanotechnology.* 5:574-578.
International Preliminary Report on Patentability dated Oct. 15, 2012, for related International Application No. PCT/US11/47800.
International Search Report and Written Opinion dated Jan. 5, 2012 for related International Application No. PCT/US11/47800.
International Search Report dated Mar. 12, 2014 for related International Application No. PCT/US2013/074942.
Written Opinion dated Mar. 12, 2014 for related International Application No. PCT/US2013/074942.
International Preliminary Report on Patentability dated Oct. 1, 2014, for related International Application No. PCT/US2013/033403.
Kim et al. (Mar. 1, 2010) "Fabrication and Characterization of Large-Area, Semiconducting Nanoperforated Graphene Materials," *Nano Letters.* 10:1125-1131.
Liu et al. (Jun. 9, 2008) "Graphene Oxidation: Thickness-Dependent Etching and Strong Chemical Doping," *Nano Letters.* 2008 8:1965-1970.
Morse (Apr. 30, 2010) "Review of Kim et al. (Mar. 1, 2010) Fabrication and Characterization of Large-Area, Semiconducting Nanoperforated Graphene Materials," *InterNano Resources for Nanomanufacturing.*
*Nanoporous Graphene Could Outperform Best Commercial Water Desalination Techniques*; Tanugi & Grossman; ACS 20 12; Jun. 25, 2012; Weftec; Sep. 29-Oct. 3, 2012.
"Pall Water Processing Disc-Tube Filter Technology", Pall Corporation, [retrieved on Feb. 10, 2015], retrieved from http://www.pall.com/pdfs/Fuels-and-Chemicals/Disc-Tube_Filter_Technology-DT100b.pdf.

* cited by examiner

TUNABLE LAYERED MEMBRANE CONFIGURATION FOR FILTRATION AND SELECTIVE ISOLATION AND RECOVERY DEVICES

CROSS-REFERENCE TO RELATED APPLICATIONS

This application claims priority of U.S. Provisional Application Ser. No. 61/617,264 filed Mar. 29, 2012, which is incorporated herein by reference.

TECHNICAL FIELD

Generally, the present invention relates to a membrane configuration design for filtration and selective fluidic isolation and recovery devices. Specifically, the present invention relates to a layered membrane configuration for a filtration or selective fluidic isolation and recovery device. More particularly, the present invention is directed to a layered configuration of materials that include at least one high flux, high selectivity membrane. The layers may be arranged in a planar, spiral wound or other alternate multiple pass configuration in dead end flow or cross flow.

BACKGROUND ART

Currently, nearly half of the online capacity of desalinated water is achieved through a reverse osmosis filtering process. Reverse osmosis market share is growing but current reverse osmosis technology remains capital and energy intensive, with limitations in product design and performance based upon current polymer filtration membranes. The current industry standard for polymer filtration is an eight inch diameter by forty inch length spiral wound membrane with 400 to 440 square feet of active membrane area. Such devices are limited in permeability which in turn limits output water per unit area, or flux, and requires increased membrane area and operating pressures. These high membrane area requirements and operating pressures are a result of membrane resistance (that is, permeability) as well as concentration polarization, scaling, fouling, and the like. As such, these filtration devices require frequent cleaning and ultimately replacement. The limitations in relation to the flux and associated membrane area requirements result in significant capital cost. The need for high operating pressure devices increase the energy required to operate the filtration device and which further results in degradation of the membrane due to fouling and compaction which also adds to the operating cost.

Current filtration devices for reverse osmosis utilize an eight inch diameter by forty inch length spiral wound design. Within the filtration media there are twenty to thirty-four membrane leafs which provide for an active membrane area for maximum filtration output. Although improvements have been made in the filtration media, these are only incremental improvements and do not address the issues raised in regard to limited flux throughput or the requirement for high operating pressures.

The reverse osmosis approach to filtering and/or desalination is to employ active filtering layers utilizing polyimide components. Such technology utilizes solution diffusion so as to separate the feed material into a concentrate and permeate. In the reverse osmosis technology, the membranes are susceptible to fouling, scaling and compaction. These materials also have limited chemical and biological resistance with limited methods of cleaning, which in turn relates to the need for frequent replacement of the filtration devices.

To protect the membrane materials, robust chemical conditioning and pretreatment is needed as a front end stage prior to desalination. Pretreatment is capital intensive and requires plant space, equipment, energy, and chemicals. Current pretreatment methods include conventional filtration and membrane filtration. Conventional filtration types include cartridge filtration and media filtration such as flocculation, sedimentation, dissolved air flotation, diatomaceous earth, granular media, pressure filters and gravity filters. Membrane filtration includes submerged microfiltration/ultrafiltration and pressurized microfiltration/ultrafiltration.

Furthermore, current state reverse osmosis membranes in some installations require multiple post treatment stages to achieve the desired product water. These additional stages require additional plant space and energy consumption.

Therefore, there is a need in the art for filtration devices that provide for improved flow characteristics, reduced size and weight and increased operational life while reducing or consolidating the demand for extensive pre-treatment and post treatment.

SUMMARY OF THE INVENTION

In light of the foregoing, it is a first aspect of the present invention to provide a tunable layered membrane configuration for filtration and selective isolation and recovery devices.

It is another aspect of the present invention to provide a tunable membrane configuration for a filtration or selective fluidic isolation and recovery device, comprising a housing having an inlet at one end and an outlet at an opposite end, the housing having an opening extending from the inlet to the outlet, an internal support structure maintained in the opening, and a layered filtration media carried by the internal support structure, the media separating feed received at the inlet into at least three separate output flows.

It is still another aspect to provide a device according to the above, wherein the filtration media comprises at least three flow channels, and at least two different planar membranes disposed adjacent two of the at least three channels, the membranes having different tunable selectivity, producing an effective porosity, to filter the feed into the at least two outputs/permeates.

It is another aspect for the embodiment above to provide the device, wherein the filtration media further comprises a membrane support structure associated with each membrane and carried by the internal support structure.

It is yet another aspect for the embodiment above to provide the device, wherein one of the at least three channels is a first channel having at least one of a first planar membrane on each side thereof.

It is still another aspect for the embodiment above to provide the device, wherein one of the at least three channels is a second channel having the membrane support structure on one side and a second planar membrane on an opposite side.

It is a further aspect for the embodiment above to provide the device, wherein one of the at least three channels is a third channel having the membrane support structure on both sides thereof.

It is another aspect for the embodiment above to provide the device, wherein the planar membranes are constructed from perforated graphene materials.

It is yet another aspect for the embodiment above to provide the device, wherein the planar membrane can be tuned for increased selectivity though pore size or charge characteristics via electric charge or functionalization, or to provide planar membranes capable of carrying electrical charge and that are controlled in such manner to disrupt the effects of concentration polarization at the membrane's surface, or to provide one of the planar membranes for selective isolation or recovery of a specific target in the feed by combined use of pore control and electrical charge.

It is still another aspect of the selective isolation embodiment to provide pore control and electrical charge in combination to create an effective porosity for increased selectivity of rejection of charged particles in the feed.

It is another aspect for the first embodiment above to provide filtration media that comprises planar membranes constructed from perforated graphene, and wherein the planar membranes are configured for multiple stages of filtration including microfiltration/ultrafiltration and nanofiltration/reverse osmosis in a single device, or multiple stages of one type of filtration with more selective bands.

It is a further aspect for the first embodiment above to provide filtration media that comprises planar membranes constructed from perforated graphene, and wherein the planar membranes are configured for multiple stages of reverse osmosis desalination to achieve product water quality in a single device, using membranes of the same selectivity.

It is still a further aspect for the first embodiment above to provide filtration media that comprises planar membranes constructed from perforated graphene, and wherein the planar membranes are configured for progressively selective stages of reverse osmosis desalination to reduce pressure of each incremental step and corresponding concentration polarization at the membrane's surface.

It is yet a further aspect for the first embodiment above to provide filtration media that comprises planar membranes constructed from perforated graphene, and wherein the planar membranes are configured for selective isolation and recovery of a target particulate, solute, or analyte within one or more of the permeate streams.

It is still a further aspect for the first embodiment above to provide layered filtration media that can be configured in a planar, tubular, or spiral wound configuration.

BRIEF DESCRIPTION OF THE DRAWINGS

These and other features and advantages of the present invention will become better understood with regard to the following description, appended claims, and accompanying drawings, none of which are to scale, wherein:

BEST MODE FOR CARRYING OUT THE INVENTION

Figure 1:
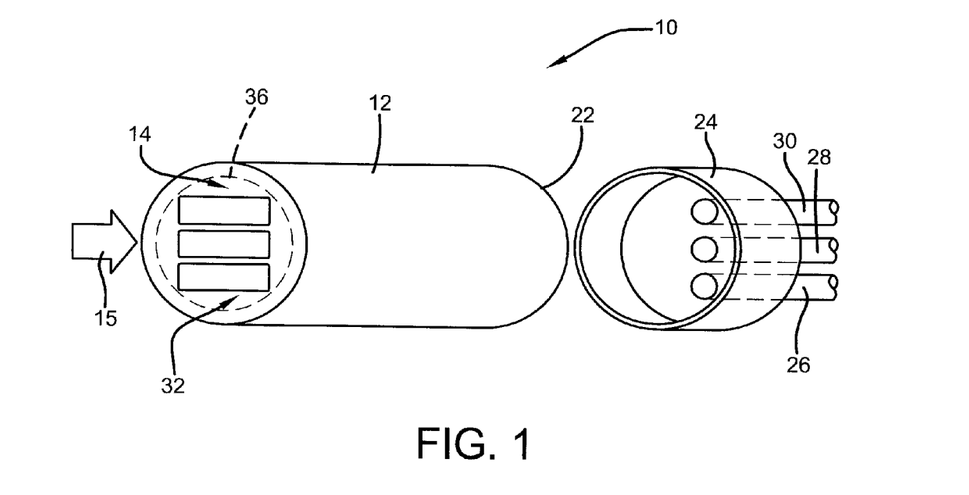
FIG. 1 is a right side enlarged perspective schematic view of a filtration device according to the concepts of the present invention.
Figure 2:
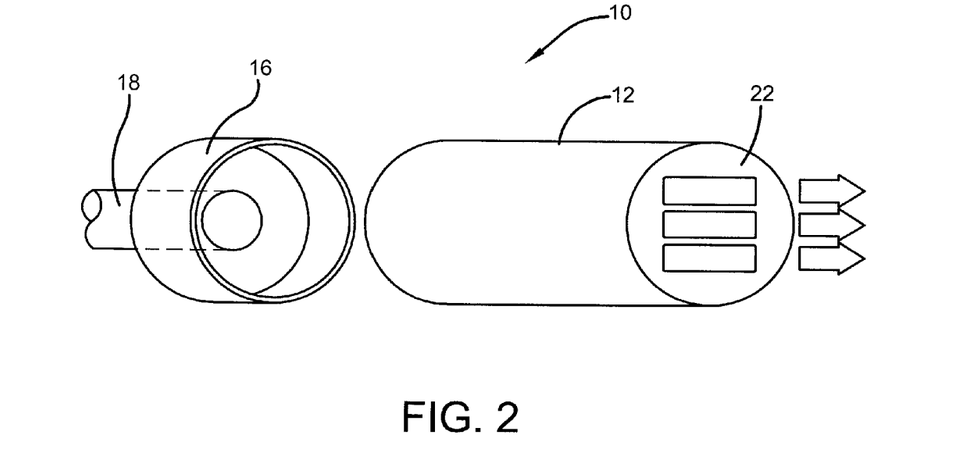
FIG. 2 is a left side enlarged perspective schematic view of the filtration device according to the concepts of the present invention.

Referring now to FIGS. 1 and 2, it can be seen that a filtration device is designated generally by the numeral 10. FIG. 1 presents a general perspective cross-sectional view of an inlet side while FIG. 2 presents a perspective general cross-sectional view of an outlet side of the filtration device. The device 10 includes a housing 12 which may be of a cylindrical construction as shown, but other shapes are believed to be possible depending upon end-use applications. In any event, the housing 12 includes an inlet 14 which receives feed 15 or other fluid for filtration or selective isolation and recovery. Although the term feed is used throughout this description, it will be appreciated that the feed or fluid material provided to the filtration device may not include water. As used herein, feed refers to the medium that includes components supplied to the filtration device for separation and removal.

Attached to the inlet is an inlet cap 16 which provides for a feed pipe 18 so as to allow for the feed to be directed into the housing. As will be appreciated by skilled artisans, the inlet cap 16 directs the received feed 15 into a plurality of feed channels as will be described. In some embodiments, the cap 16 may have conduits to direct the feed into the feed channels. In other embodiments, the feed channels may be surrounded by a non-porous surface such that the feed is directed into the feed channels.

An outlet 22 is disposed at an opposite end of the housing 12 and provides an outlet cap 24. The outlet cap 24 includes at least two exit pipes, a permeate pipe and concentrate pipe. In another embodiment, the outlet cap includes a permeate pipe 26, an intermediate permeate pipe 28, and a concentrate pipe 30. These pipes, outlet flows or conduits direct the filtered feed based upon their properties after filtration, for further use. The outlet cap 24 is configured to maintain the separation of the permeate, the intermediate permeate and the concentrate from each other. It will be appreciated that the concentrate may also be referred to as a permeate.

Depending on the application, any of the filtrations of the feed could include a target product for retrieval or target impurity or contaminant for removal. If only one target concentrate is desired, permeate streams can be combined for disposal or disposed of separately. It may be desired to recover an intermediate product, such as a precious metal recovery, where a middle stage is the product and all other stages are collected for either disposal or reuse. In water recovery applications, typically the final separation produces the filtrate and other stages will be concentrate for disposal. As will be discussed, the layering of membranes and outlet pipes can be scaled for any desired number of concentrate and permeate streams.

Figure 3:
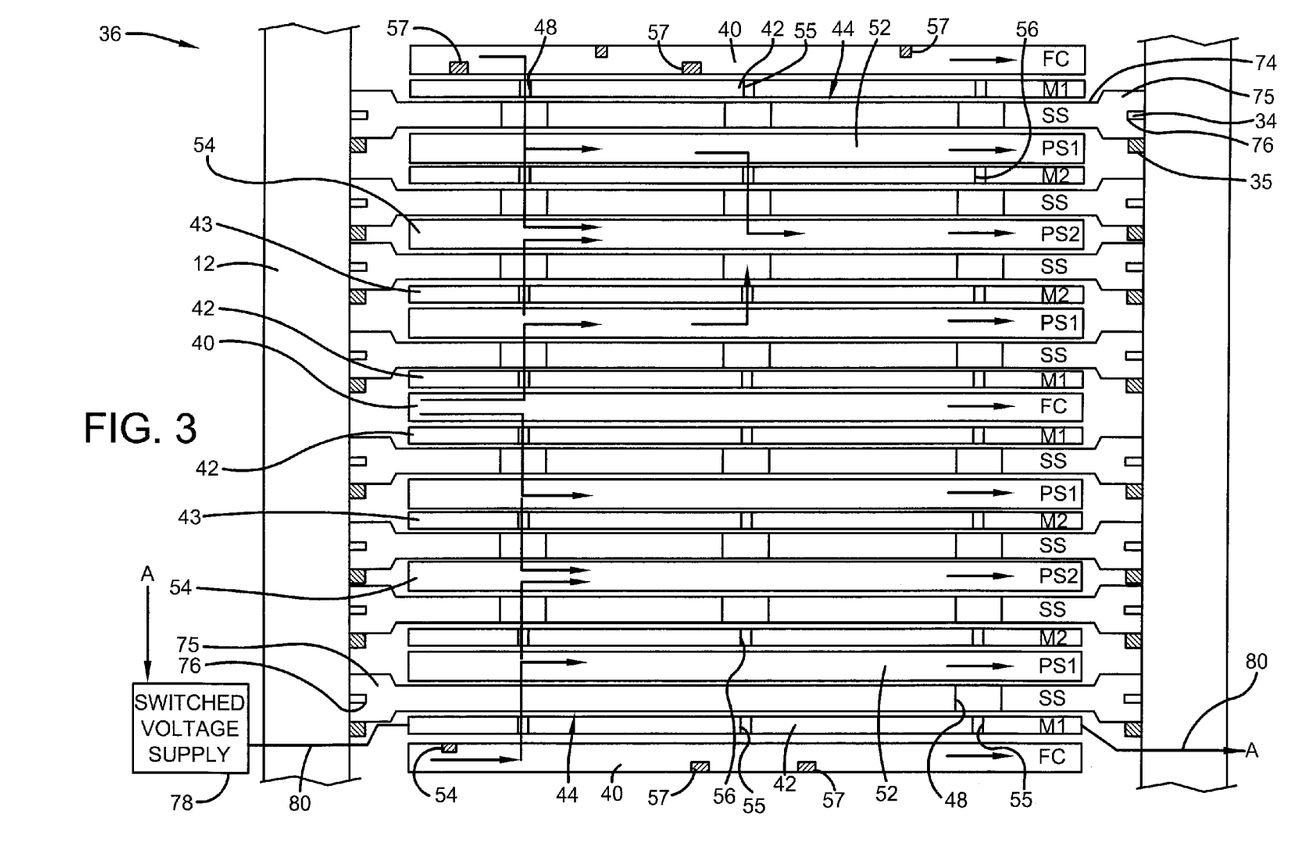
FIG. 3 is a cross-sectional schematic view of the filtration device showing a filtration media according to the concepts of the present invention.

Referring now to FIGS. 1-3, the housing 12 includes an opening 32 which extends the entire length thereof. Maintained within the housing 12 is an internal support structure 34 which includes various ledges, steps or other structural features so as to support a filtration media designated generally by the numeral 36. Other packaging arrangements are possible including spiral wound or tubular configurations.

The filtration media 36 includes a planar layered configuration which includes at least one feed channel 40, at least one high flux first membrane 42, at least one high flux second membrane 43, at least one membrane porous support structure 44, at least one first permeate spacer 52, and at least one second permeate spacer 54. The alphanumeric designations FC (feed channel 40), M1 (first membrane 42), M2 (second membrane 42), SS (support structure 44), PS1 (permeate spacer 52), and PS2 (permeate spacer 54) are provided in FIG. 3 to provide a clear designation as to each layer. It will be appreciated that although the various layers of filtration media are shown slightly spaced apart for clarity purposes, in practice the various adjacent layers will be in touching contact with one another, with seals as appropriate between membranes, feed channels, and permeate spacers so as to provide separated output flow paths between permeates and concentrates. It will further be appreciated that the membrane and membrane porous support structure can be a single composite membrane. Different positional arrangements of the aforementioned components can be utilized depending upon the components in the feed and how the components can best be efficiently separated or filtered from one another. As used herein, the feed may contain undesired constituents such as sodium, chlorine, salts, toxins, viruses, bacteria, and other suspended contaminants of similar size that are carried by a fluid medium such as a solvent or water.

Generally, the feed 15 is received by at least one feed channel 40 which delivers the feed to a high flux membrane 42 that is supported by the support structure 44. The feed channel 40 may contain a spacer material consisting of either a woven or non-woven material. The feed spacer material is constructed from a polymeric material such as polypropylene, polyethylene, polyester, polyamides, and/or fluoropolymers. Non-polymeric materials possessing desirable hydrodynamic and application specific properties such as porous ceramics or porous sintered metals, or other materials possessing desirable hydrodynamic and application specific properties may also be used for the feed spacers. The feed channel may have a thickness of between 0.02" to 0.04". Other embodiments may use thicknesses of between 0.02" to 0.20" for the feed channels. The feed channel 40 is configured to allow the feed to flow from the inlet toward the outlet. Each membrane support structure includes a plurality of holes 48 such that the structure provides minimal flow resistance. In certain packaging configurations, a feed spacer can function to set a channel height for the feed to flow through.

In the present embodiment, the support structure is constructed from polymeric materials such as polycarbonate or polyester, which may be used in conjunction to comprise a laminated or composite backing structure depending on the application. Other materials with similar structural hydrodynamic properties could be used. The holes 48 are sized anywhere between 15 to 200 nanometers in diameter and may be spaced apart from one another depending on hole size used, with it being desirable to use backing material as open as possible to maintain a desirable flow while adequately supporting the membrane. Indeed, a structure 44 having an open area of up to 25% could be used. Other hole sizing and spacing may be used.

In some embodiments the channel height may be sized to accommodate a range of channel spacer designs to receive a mechanical mechanism 57 that generates turbulence of the fluid prior to the feed entering the high flux membrane 42. The mechanical mechanisms 57 may include, but are not limited to, ribs or protrusions that are adjacent or integral with the feed channel 40 or feed spacer, if used. Turbulence may also be generated by electrical mechanisms may include, but are not limited to alternating current or direct current charges.

In the present embodiment, each of the high flux membranes 42 and 43 is a graphene membrane as described in U.S. Pat. No. 8,361,321, which is incorporated herein by reference. The graphene membrane is a single-atomic-layer-thick layer of carbon atoms, bound together to define a sheet. The thickness of a single graphene membrane, which may be referred to as a layer or a sheet, is approximately 0.2 to 0.3 nanometers (nm). In some embodiments, multiple graphene layers can be formed, having greater thickness and correspondingly greater strength. Multiple graphene sheets can be provided in multiple layers as the membrane is grown or formed, and is commonly known as few-layer graphene. Alternatively, multiple graphene sheets can be achieved by layering or positioning one graphene layer on top of another. For all the embodiments disclosed herein, a single layer of graphene or multiple graphene layers may be used. Testing reveals that multiple layers of graphene maintain their integrity and function, possibly as a result of self-adhesion. This improves the strength of the membrane and in some cases flow performance. The perforated graphene high flux throughput material provides significantly improved filtration properties, as opposed to polyamide or other polymeric material filtration materials. In most embodiments, the graphene membrane is 0.5 to 2 nanometers thick. The carbon atoms of the graphene layer define a repeating pattern of hexagonal ring structures (benzene rings) constructed of six carbon atoms, which form a honeycomb lattice of carbon atoms. An interstitial aperture is formed by each six carbon atom ring structure in the sheet and this interstitial aperture is less than one nanometer across. Indeed, skilled artisans will appreciate that the interstitial aperture is believed to be about 0.23 nanometers across at its longest dimension. Accordingly, the dimension and configuration of the interstitial aperture and the electron nature of the graphene precludes transport of any molecule across the graphene's thickness unless there are perforations. This dimension is much too small to allow the passage of either water or ions.

In order to form the perforated graphene membrane, one or more perforations are made. A representative generally or nominally round apertures or perforations 55 are defined through the graphene membrane 42. The graphene membrane 43 will have apertures 56 that are smaller in diameter than apertures 55. For example, aperture 55 may have a nominal diameter of about 1.4 nanometers or a range of diameters of between 1.2 to 1.6 nm, while aperture 56 may have a diameter of about 0.9 nm or a range of between 0.8 to 1.2 nm. The eight tenth nanometer dimension is selected to block the smallest of the ions which would ordinarily be expected in salt or brackish water, which is the sodium ion. In a similar manner, the 1.2 nanometer dimension is selected to block ions such as divalent ions, which are also found in salt water. To properly filter the feed into permeates, the feed will be directed through the two or more membranes which have progressively smaller diameters. In the present embodiment, the first membrane would block the divalent ions and the second membrane would block the monovalent ions. The generally round shape of the apertures are affected by the fact that the edges of the aperture are defined, in part, by the hexagonal carbon ring structure of the graphene membrane 42. Other aperture sizes may be selected depending upon the constituents of the feed and the constituents or components of the feed that is desired to be blocked or filtered. Accordingly, the apertures 55 and 56 may range in size from 0.5 nm to 1.2 nm in some embodiments, or from 1.0 to 10 nm in other embodiments. And in other embodiments, the size of the apertures 55 and 56 may range from 10 nm to 100 nm.

Apertures in the graphene membrane may be made by selective oxidation, by which is meant exposure to an oxidizing agent for a selected period of time. It is believed that the apertures 55/56 can also be laser-drilled. As described in the publication Nano Lett. 2008, Vol. 8, no. 7, pg 1965-1970, the most straightforward perforation strategy is to treat the graphene film with dilute oxygen in argon at elevated temperature. As described therein, through apertures or holes in the 20 to 180 nm range were etched in graphene using 350 mTorr of oxygen in 1 atmosphere (atm) argon at 500° C. for 2 hours. The paper reasonably suggests that the number of holes is related to defects in the graphene sheet and the size of the holes is related to the residence time. This is believed to be the preferred method for making the desired perforations in graphene structures. The structures may be graphene nanoplatelets and graphene nanoribbons. Thus, apertures in the desired range can be formed by shorter oxidation times. Another more involved method as described in Kim et al. "*Fabrication and Characterization of Large Area, Semiconducting Nanoperforated Graphene Materials*," Nano Letters 2010 Vol. 10, No. 4, Mar. 1, 2010, pp 1125-1131 utilizes a self assembling polymer that creates a mask suitable for patterning using reactive ion etching. A P(S-blockMMA) block copolymer forms an array of PMMA columns that form vias for the RIE upon redeveloping. The pattern of holes is very dense. The number and size of holes is controlled by the molecular weight of the PMMA block and the weight fraction of the PMMA in the P(S-MMA). Either method has the potential to produce perforated graphene sheets. Other methods of forming the apertures may be employed. In the embodiments disclosed herein, it will be appreciated that the apertures are sized to block selected components of the feed and allow passage of other components. Moreover, the edges of the apertures may be modified to assist in blocking or passing of selected components.

Although graphene is an exemplary material for use as the high flux membrane 42/43, skilled artisans will appreciate that other materials such as boron nitride, metal chalcogenides, silicene and germanene, and molybdenum disulfide offer two dimensional thinness, although use of these materials for filtration applications is not known to be as ideal as graphene. In any event, the membranes 42/43 function to preclude passage of unwanted components of the feed while allowing the desired components to pass therethrough and, accordingly through the support structure 44 by virtue of structure holes 48 provided therethrough. After passing through the first support structure 44, the fluid material flows into the first permeate spacer 52. Underneath the spacer 52 is the second membrane 43 which is supported or carried by another underlying support structure 44. Fluid that flows through the underlying support structure 44 is then received into the second permeate spacer 54. In the present embodiment, both sides of the permeate spacer 54 are adjacent to support structures 44. This layered construction is repeated as shown or as needed to filter the feed into the desired concentrate and permeates. In the present embodiment, the permeate spacer 52 is constructed and sized for compressive loads which will have a substantially different magnitude from those of the feed spacer 42 for high pressure operation. The purpose of the permeate spacers differs as it primarily provides structural support to the membrane and does not generally serve to produce flow turbulence as does the feed spacer. The permeate spacer also provides a conduit for permeate flow from the back side of the membrane to a common permeate collection means. Skilled artisans will appreciate that construction and sizing of the permeate spacer may be varied depending upon the characteristics of the feed and therefore the operating pressure and permeate flux rate.

In the embodiment shown in FIG. 3, the uppermost membrane support structure 44 supports the first membrane 42. The filtered material flows through the membrane 42 and the membrane support structure 44 and it is received by the permeate spacer 52. Disposed on the underside of the spacer 52 is the other membrane 43 which is supported by another support structure 44. Disposed between that support structure and another like structure is the spacer 54. With the spacer 54 as a middle component, a reverse ordering of layers is provided: a second membrane 43, spacer 52, support structure 44, membrane 42, and the feed channel 40. These planar layers are configured so as to provide the desired material flows. Flow through the device moves from the input side to the output side down the length of the housing, with permeate flows moving down the corresponding permeate channels, tangential to the corresponding membrane surfaces. The flow direction is in and out of the page as viewed in FIG. 3. The directional arrows provided in FIG. 3 are for the purpose of showing how the feed flows from one layer to another.

The filtration media 36 is configured to optimize the relationship of the various layers with one another. As such, each feed channel 40 has at least one membrane on one side thereof, and in some instances both sides. A spacer may be provided between membranes that are adjacent one another. Each permeate spacer 52 has a support structure 44 on one side and a first membrane 42 on an opposite side. Each second membrane 43 has a permeate spacer 52 on one side and a support structure 44 on an opposite side. Each permeate spacer 54 has a support structure 44 on both sides. Finally, each membrane 42 is positioned between a support structure 44 on one side and a feed channel on an opposite side. The filtered material that collects in the permeate spacer 52 then flows out the housing through the permeate pipe 26. The filtered material that collects in the permeate spacer 54 then flows out the housing through the permeate pipe 28. The unfiltered or blocked material that remains in the feed spacers flow out the housing through the concentrate pipe 30.

As skilled artisans will appreciate, the channels 40, the spacers 52, and 54, and the membranes 42 and 43 are of a planar construction. In other words, each are provided with a width and length which receives the feed supply and the filtered fluid. In the present embodiment the support structure 44, along with the membranes 42 which they support, are removable from the housing by virtue of their retention by the internal support structure 34. The support structure 44 includes a lateral edge 74 along each side that provides a handle 75. Each handle 75 includes a groove 76. Each groove 76 is slidably receivable on a corresponding ridge 34. Additionally, an underside of each handle 75 may be slidably received on a corresponding ledge 35. The support structure 44 can be mechanically fastened to the internal support structure—ridges 34, ledges 35—to maintain pressure during operation. Unfastening of the support structures allows access to the spacers and membranes located inside the housing. In other embodiments the construction may be spiral wound, or other geometries where multiple passes are achieved. As previously discussed, the membranes 42 and 43 may be high flux throughput material.

Adjacent layers may be specifically associated with one another. For example, a layered sequence of a first membrane 42, a support structure 44, a permeate spacer 52, a second membrane 43, another support structure 44, a permeate spacer 54, yet another support structure 44, another second membrane 43, another permeate spacer 52, still another support structure 44, and another first membrane 42 could be configured so as to form a membrane leaf structure. The leaf structure, which may have any number of different membranes with different aperture diameters, could be removed and replaced as needed. The associated support structures could be secured to one another as needed.

In one embodiment, the membranes are constructed from the perforated graphene material with a number of enabling tunable characteristics including pore size control through use of various perforation techniques, examples of which have been described above, and charge, electrical or chemical modifications, as described in U.S. patent application Ser. No. 13/422,753 for Functionalization of Graphene Holes for Deionization, which is incorporated herein by reference. A layered graphene based membrane can be made with macro sized sheets of graphene joined to a support porous backing or by micro size platelets deposited on a porous backing so as to effectively create a solid graphene filtration layer on said backing. In all cases, the graphene is porous so as to allow flow of desired fluids. In some cases, graphene as grown with nano-scaled imperfections may be suitable for certain applications.

In some embodiments, a switched voltage supply 78, which is maintained outside the housing but could be within the housing, is connected to the membranes 42 and/or 43 by a pair of conductors 80. In most embodiments, the conductors are attached at diametrically opposite ends of the respective membranes 42 and 43. As skilled artisans will appreciate, application of an electrical voltage to a membrane 42 or 43 that is graphene or has some other electrically conductive material generates a repulsive force that causes turbulence that is transmitted or transferred to the feed, in particular the polarized salt ions within the feed. In some embodiments, the forces will be alternated between repulsive and attractive to produce maximum turbulence. This turbulence assists in moving the permeate and condensate away from the membrane's surface and through the various layers. In the perforated graphene embodiment, the material is able to conduct an electrical charge which can be controlled to disrupt concentration polarization, thereby lowering operating pressure.

Figure 4:
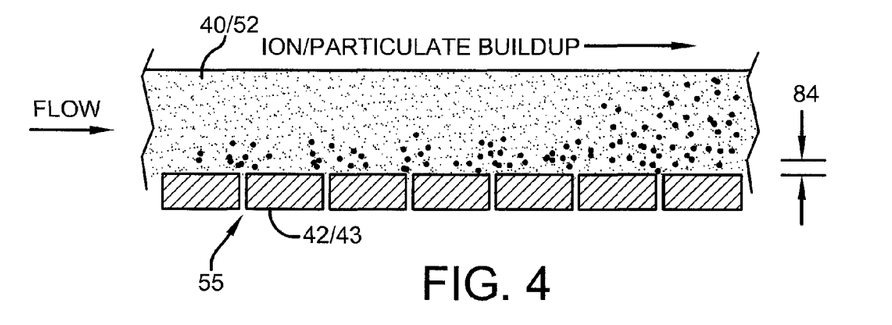
FIG. 4 is a cross-sectional schematic view showing a membrane in the filtration media where concentration polarization occurs on the surface of the membrane.
Figure 5:
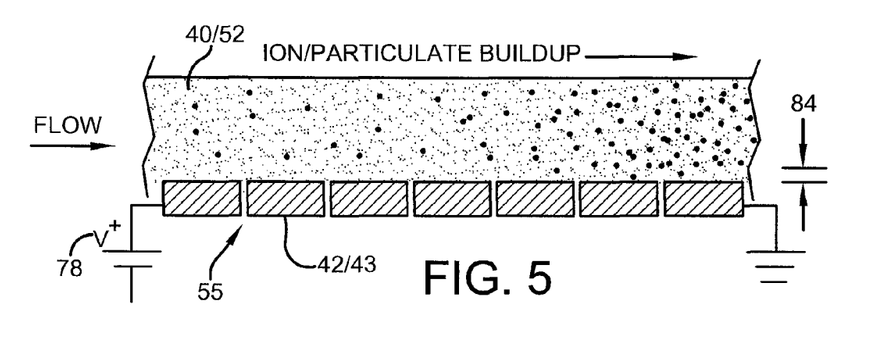
FIG. 5 is a cross-sectional schematic view showing the membrane connected to an applied voltage source which disrupts a boundary layer of concentration polarization for charged particles.
Figure 6:
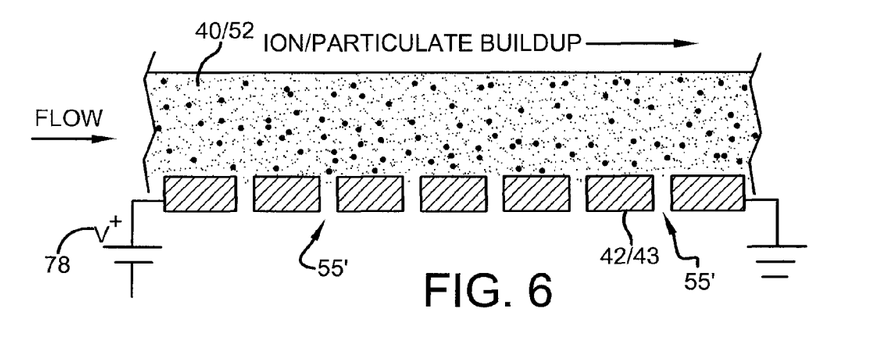
FIG. 6 is a cross-sectional schematic view showing the membrane connected to an applied voltage source combined with an adjusted membrane aperture size for high flux, high selectivity filtration of charged particles.

As feed flows through the membrane and salts are rejected by the membrane, as seen in FIGS. 4-6, a boundary layer is formed near the membrane surface in which the salt concentration exceeds the salt concentration in the bulk solution. This increase of salt concentration is called concentration polarization. The effect of concentration polarization is to reduce actual product water flow rate and salt rejection versus theoretical estimates. As shown in FIG. 4, an exemplary membrane 42/43 and channel 40/52 is shown along with a representation of concentration polarization that occurs as the blocked ions or particulates, which is identified as "ion/particle buildup" in FIGS. 4-6 and schematically represented as dots, accumulate near the apertures 55 and toward the rear of the flow area. The layer 84, if left in place, can effectively block or clog the apertures. As such, use of the switchable voltage supply 78, which may be connected to any one or all of the membranes 42/43 is beneficial in repelling the blocked ions and in maintaining flow of the concentrate and permeates through the filtration media as represented in FIG. 5. Furthermore, the electrical charge carrying capability provided by the supply 78 can be combined with pore size control on at least one layer to increase selectivity of salt rejection in the membrane as shown in FIG. 6. Pore size control allows for use of enlarged apertures 55' which permits higher flow through the membrane while still adequately blocking the ions/particulates of interest. In another embodiment, charge characteristics could be achieved through chemical functionalization which is described in previously mentioned U.S. patent application Ser. No. 13/422,753. In a water filtration application with perforated graphene, separation can be achieved through a single layer in which rejection control is tuned through pore size control, or a combination of pore size control and charge characteristics for the required selectivity. Furthermore, concentration polarization effects can be mitigated with use of electrical charge to disrupt the boundary layer effects experienced with current state of art polymeric membranes as shown in FIG. 6.

The high flux throughput material provides significantly improved filtration properties, as opposed to polyimide or other polymeric material filtration materials. In most embodiments, the graphene material is 0.3 to 5 nanometers thick. Regardless of the thickness or type of material used, the membranes 42 and 43 will be provided with different porosity so as to selectively pass and/or block components in the feed. For example, using a layered planar design, the membrane 42 can be configured with porosity suitable to perform ultrafiltration and reject particles in the 5-100 nanometers or greater range including colloids, proteins, microbiological contaminants, and large organic molecules. The concentrate will be retained by the first membrane in the stack, while the permeate, still including monovalent and divalent salts, will pass to the second membrane surface. The second high flux membrane will be configured with a porosity suitable for salt rejection and reject all salts above approximately 1 namometer, allowing only pure water to pass through. This will result in two reject streams that can be harvested separately if desired, and one product water stream for each membrane stack. This example is for two stages of rejection in a dual membrane stack. Depending on the need, this stack can be expanded for multiple stages of rejection. This concept can also be used for multi-stages of reverse osmosis for refined rejection (improved salt rejection, boron rejection) and improved output water quality if needed. Furthermore, this concept can be used for progressively selective salt filtration, meaning each layer is tuned for increasing selectivity of salt rejection. This enables incremental salt removal at lower pressures in each step, mitigating concentration polarization and associated pressure inefficiencies and material structural loading.

In another embodiment, the tunable membrane configuration can be used to selectively recover a particulate, solute, or analyte of interest. The substance can be targeted for its value as a product such as a precious metal, or the importance of isolating it for disposal such as contaminant. In this case the first membrane will be tuned or sized to reject all substances larger that the target substance, allowing the target substance and all substances smaller to pass through. The second membrane will be tuned or sized to block the target substance, allowing all smaller substance to pass through and selectively isolating the substance of interest. Again, in the perforated graphene embodiment the use of electrical charge can further be used to increase the selectivity of flux at which the filtration or recovery process occurs. As used herein, tunable selectivity is the ability to control the specific solutes or particles that a membrane rejects, recovers or isolates based on physical size via membrane pore control, with the option to supplement by use of material functionalization of the hole periphery or applied electrical charge to a conductive membrane.

In the present embodiment the membrane support structures 44, along with the membranes 42 and 43 which they support, are removable from the housing by virtue of their support by the internal support structure 34 and 35.

The filtration media 16 can be configured with the various layers disclosed and selection of membrane aperture sizes to provide microfiltration, ultrafiltration, nanofiltration, and reverse osmosis in a single media and/or multiple stages of one type of filtration with more selective bands of filtration by using progressively smaller aperture sizes in each membrane. In another embodiment, the filtration media can be configured to provide multiple states of reverse osmosis desalination to achieve product water quality in a single device using membranes of the same selectivity. In yet another embodiment, the filtration media can be configured to provide progressively selective stages of reverse osmosis desalination to reduce pressure of each incremental step and corresponding concentration polarization at the membrane's surface.

The membrane configuration shown in filtration device 10 has several readily apparent advantages. By utilizing ultra thin or two dimensional materials, it provides for consolidation of multiple levels of filtration in a single device design. The design may be a layered planar design, spiral wound design, or other geometry that accommodates multiple passes. The consolidation of filtration stages reduces the overall size required for a filtration operation. Indeed, use of a high flux throughput material, such as a perforated graphene material, allows for a reduction in volume and weight by a factor of anywhere between five to fifty times. Still yet another advantage of the filtration device 10 is that it allows for multiple devices to be attached in series to provide additional filtering as needed. Another advantage is that the tunable membrane design allows for "tuned" filtering of the feed supply. In other words, selective materials can be separated for a desired end use be it disposal or use. Furthermore, with perforated graphene the use of electrical charge can be incorporated to further improve selectivity and flux during the filtration or recovery operation.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A filtration or selective fluidic isolation and recovery device, comprising:
   a housing having an inlet at one end and an outlet at an opposite end, said housing having an opening extending from said inlet to said outlet;
   an internal support structure maintained in said opening;
   a tunable membrane configuration, comprising:
      a layered filtration media carried by said internal support structure for separating feed received at said inlet into at least three separate output flow paths; wherein said layered filtration media comprises:
         at least three flow channels;
         at least two different planar membranes disposed adjacent two of said at least three flow channels, wherein at least one of said two different planar membranes comprises an electrically tunable graphene material; and
      a switchable voltage supply configured to supply a voltage along a length of the electrically tunable graphene material.

2. The device according to claim 1, wherein said layered filtration media further comprises:
   a membrane support structure associated with each of said planar membranes and carried by said internal support structure.

3. The device according to claim 2, wherein one of said at least three flow channels is a first channel having at least one of a first planar membrane on each side thereof.

4. The device according to claim 3, wherein one of said at least three output flow paths is a second channel having said membrane support structure on one side and a second planar membrane on an opposite side.

5. The device according to claim 4, wherein one of said at least three output flow paths is a third channel having said membrane support structure on both sides thereof.

6. The device according to claim 1, wherein said electrically tunable graphene material is a perforated graphene material.

7. The device according to claim 6, wherein said planar membranes are functionalized.

8. The device according to claim 6, wherein said planar membranes are intermittently charged to disrupt the effects of concentration polarization at the membrane's surface.

9. The device according to claim 1, wherein said layered filtration media comprises planar membranes constructed from perforated graphene, and wherein said planar membranes are configured for multiple stages of progressively selective filtration.

10. The device according to claim 1, wherein said layered filtration media comprises planar membranes constructed from perforated graphene, and wherein said planar membranes are configured for multiple stages of same selectivity filtration.

11. The device according to claim 9, wherein pressure and concentration polarization are reduced at each of the multiple stages of progressively selective filtration.

12. The device according to claim 1, wherein said layered filtration media is configured in a planar, tubular, or spiral wound configuration.

13. The device according to claim 1, wherein the electrically tunable graphene material has a thickness selected from a range of 0.3 to 5 nm.

14. The device according to claim 1, wherein the layered filtration media rejects particles having a size selected from a range of 5 to 100 nm.

15. The device according to claim 1, wherein the layered filtration media rejects particles having a size greater than 1 nm.

16. The device according to claim 1, wherein a first planar membrane of the at least two different planar membranes rejects particles having a size selected from a range of 5 to 100 nm and a second planar membrane of the at least two different planar membranes rejects particles having a size greater than 1 nm.

17. The device according to claim 16, wherein permeate passing through said first planar membrane may be recovered from said housing.

18. The device according to claim 7, wherein said planar membranes are functionalized at hole peripheries.

19. The device according to claim 1, wherein none of the planar membranes is in direct contact with the housing.

20. A tunable membrane configuration, comprising:
   a layered filtration media for separating feed into at least three separate output flow paths; wherein said layered filtration media comprises:
      at least three flow channels;
      at least two different planar membranes disposed adjacent two of said at least three flow channels, wherein at least one of said two different planar membranes comprises an electrically tunable graphene material; and
   a switchable voltage supply configured to supply a voltage along a length of the electrically tunable graphene material.

21. The tunable membrane configuration according to claim 20, wherein said layered filtration media further comprises:
   a membrane support structure associated with each of said planar membranes.

22. The tunable membrane configuration according to claim 21, wherein one of said at least three flow channels is a first channel having at least one of a first planar membrane on each side thereof.

23. The tunable membrane configuration according to claim 22, wherein one of said at least three output flow paths is a second channel having said membrane support structure on one side and a second planar membrane on an opposite side.

24. The tunable membrane configuration according to claim 23, wherein one of said at least three output flow paths is a third channel having said membrane support structure on both sides thereof.

25. The tunable membrane configuration according to claim 20, wherein said electrically tunable graphene material is a perforated graphene material.

26. A method of filtration comprising:
  providing a filter device comprising:
    a housing having an inlet at one end and an outlet at an opposite end, said housing having an opening extending from said inlet to said outlet;
    an internal support structure maintained in said opening; and
    a tunable membrane configuration, comprising:
      a layered filtration media carried by said internal support structure;
      wherein said layered filtration media comprises:
        at least three flow channels; and
        at least two different planar membranes disposed adjacent two of said at least three flow channels, wherein at least one of said two different planar membranes comprises an electrically tunable graphene material;
  introducing feed to said inlet for separation into at least three separate output flow paths by said layered filtration media; and
  applying a voltage along a length of the electrically tunable graphene material.

* * * * *